UNITED STATES PATENT OFFICE.

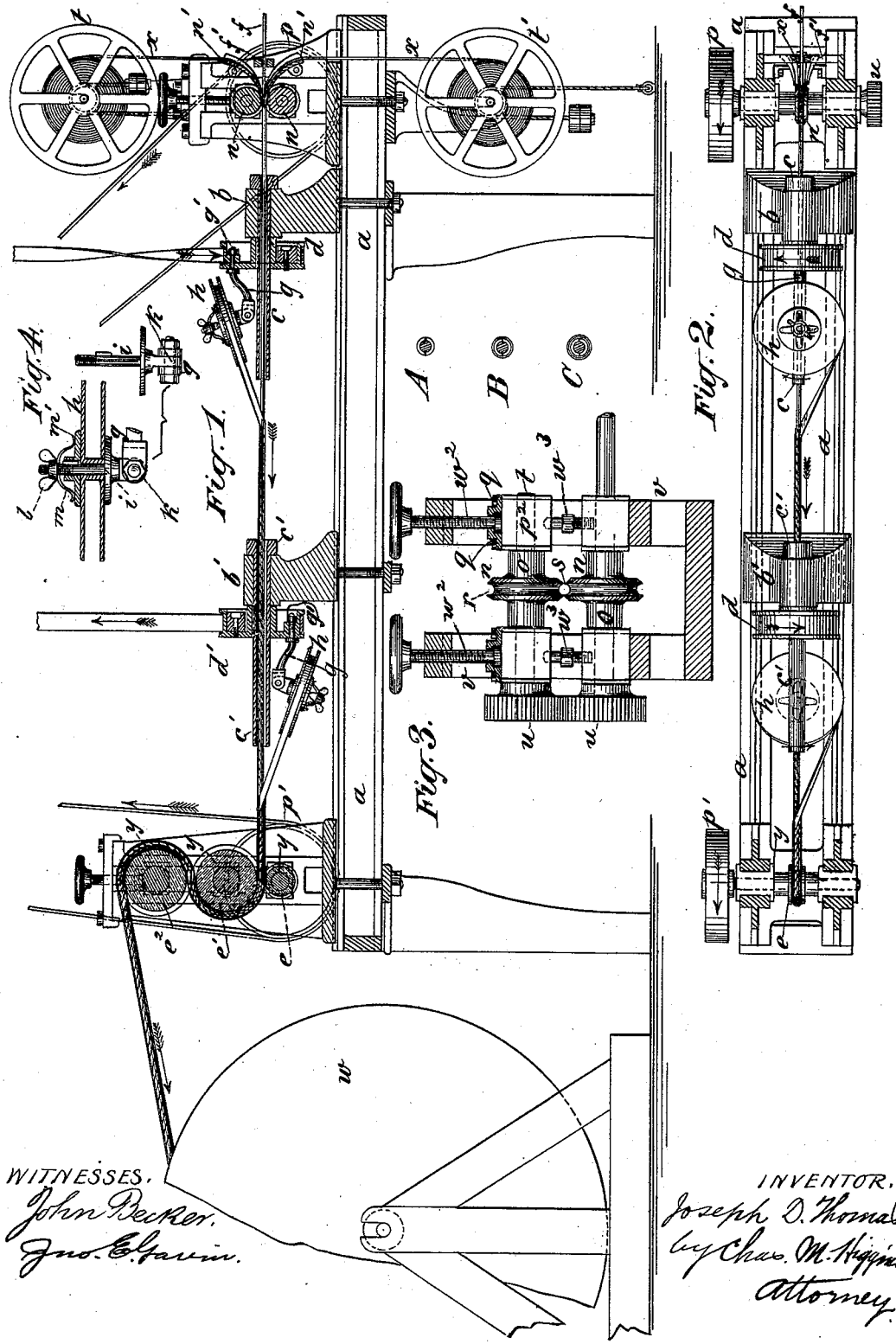

JOSEPH D. THOMAS, OF SOUTH FRAMINGHAM, MASSACHUSETTS.

MACHINE FOR COVERING OR INSULATING WIRE.

SPECIFICATION forming part of Letters Patent No. 384,404, dated June 12, 1888.

Application filed August 20, 1887. Serial No. 247,417. (No model.)

*To all whom it may concern:*

Be it known that I, JOSEPH D. THOMAS, of South Framingham, Middlesex county, Massachusetts, have invented certain new and useful Improvements in Machines for Covering or Insulating Wire, of which the following is a specification.

A prominent feature of my invention consists in covering wire with two or more successive adherent strips or tapes wound on spirally, the second tape being wound at a reverse inclination to the first, so that the seams of one tape "break joints" with the other tape and lie at nearly right angles to each other, whereby a very strong and impervious covering is produced.

Another feature of my improvement consists in employing tapes or strips of fibrous material coated with soft rubber or equivalent material before they are applied to the wire, whereby the rubber-coated tapes when wound about the wire as described adhere firmly to the wire and to each other, and when the covered wire is subsequently vulcanized these coatings become fixed thereon in a very firm and permanent manner, forming a perfect insulating and water-proof covering thereon, having great tenacity by reason of the spirally-overcrossing fibrous webs or tapes.

I prefer to saturate the first tape with a thin solution of vulcanizable rubber, and also to coat its inner face with a film of rubber, so as to form an adherent and insulating layer of rubber next to the metallic surface of the wire, while the outer surface of the same tape I provide with a thin film of rubber to better adhere to the second tape, which is wound over the first. This second tape I saturate like the first, and also provide it with a thin film of rubber on its inner surface to better adhere to the rubber film on the outer surface of the first tape, while I leave the outer surface of the second tape plain or free from plastic compound. I also prefer to prepare this outer tape by charging it with incombustible material, so as to be fire-proof and uninflammable, so that while the tape may be charged by contact with flame it will not catch fire or inflame.

The fibrous tapes or strips mentioned may be regularly woven tapes of proper width, or may be made from any woven fabric cut into strips, or from felt or paper.

Instead of rubber, any equivalent plastic or insulating material may be used; but soft vulcanizable rubber is much preferable, as described.

Instead of covering the naked wire directly with the two reversely-wound tapes, as described, the naked wire may first be coated with a covering of soft vulcanizable rubber applied, preferably, in the form of two longitudinal strips which are pressed and united around the wire by feed-rollers, in the manner shown in my former American patent, No. 271,750, of 1883. I generally prefer to employ this triple coating; but the first rubber coat may be omitted without departing from the most essential features of my present system.

The mechanism employed for covering the wire according to the above system is shown in the drawings annexed, and forms the subject of this application, as will be now described.

Figure 1 of the drawings gives a longitudinal section of my improved machine, and Fig. 2 a plan view thereof. Fig. 3 is a front elevation of the first feed-rollers, which apply the preliminary soft-rubber coat. Fig. 4 is a sectional detail of one of the tape-bobbins and its spindle.

A represents a cross-section of the wire after receiving the rubber coat. B is a cross-section after receiving the first tape, and C a cross-section after receiving the second tape.

In the drawings, *a a* indicate the bed or table of the machine, at the front end of which is arranged the first set of feed-rollers, *n n*, which may be adapted to simply seize the naked wire and force it into the machine, or to apply the preliminary rubber coat thereto and feed in the wire at the same time, the latter being assumed in this case and fully shown in the drawings. At the rear end of the machine is placed the second or main set of feed-rollers, $e\ e'\ e^2$, which act to pull the wire through the machine and perform the most positive feeding action on the wire. The rollers of both sets are of course positively geared together and mounted in adjustable bearings in the manner usual with rollers, and each set is also provided with driving-pulleys $p\ p'$, preferably of similar size, to receive driving-belts, whereby power is imparted to simultaneously revolve the rollers, which should rotate at similar speeds. The pulleys $p\ p'$ may be changed and varied in size when different speeds are required for different sizes of wire, as will be readily understood.

Behind the first rollers, $n\ n$, a fixed upright stock or bearing, $b$, arises from the table of the machine, and in this bearing is journaled a hollow rotary spindle, $c$, provided with a pulley, $d$, to receive a belt, whereby the spindle may be rapidly revolved, as indicated. At about the middle of the table, in front of the main feed-rollers $e\ e'$, is mounted a second upright, $b'$, with a hollow rotary spindle, $c'$, and pulley $d'$, similar to the first set. The bores of the hollow spindles $c\ c'$ are in line with each other and with the junction-line of the feed-rollers $n$ and the lower pair of feed-rollers, $e\ e'$, so that a naked wire, $f$, may be passed centrally through each of the spindles and grasped between the feed-rollers, which, being set in motion, will draw the wire at any desired speed through the spindles while the spindles are revolved about the wires. From the pulley of each spindle an arm, $g$, projects, on the end of which is sustained a bobbin, $h\ h$, which contains coils of tape, as before described. The axes $i$ of the bobbins are jointed to the split end of the arms $g$ by a short bolt, as seen in Figs. 1 and 4, provided with clamp-nuts $k$, whereby the bobbins may be set at the proper inclination to the wire and there held, as will be understood from the drawings. A proper frictional tension may be put upon the bobbins by the thumb-nuts $l\ l$, which will press the tension-springs $m\ m$ against the friction-washers $m'$, which slide on a feather on the spindle $i$ and bear on the upper side of the bobbins, as will be understood from Fig. 4.

Where the first rollers, $n\ n$, are employed to apply the preliminary rubber coat to the naked wire, the rollers will be formed, as shown in Fig. 3, with forming-grooves $r$ adapted to the size of the wire with its rubber coat, said grooves having knife-like or cutting edges $s$. Above and below the rollers $n$, as seen in Fig. 1, is mounted a large bobbin, $t\ t'$, on which are wound the soft-rubber strips $x\ x$ to be applied to the wire, said bobbins having a grooved hub, over which a weighted cord passes, as shown, to keep a proper brake or tension on the bobbin, which tension may, however, be effected in any other suitable way. The naked wire $f$ passes from a reel on which a suitable tension is maintained similar to that on the bobbins $t$, and the wire in being led from the reel passes first through a guide or draw plate, $f'$, and thence enters the grasp of the rollers $n\ n$ between the grooves $r$. Simultaneously the rubber strips $x\ x$ are led from the bobbins $t\ t'$ over guide-plates $n\ n'$, and thence enter the grasp of the rollers above and below the wire and between the grooves $r$ and the knife-edges of the rollers.

Referring now to Figs. 1, 2, and 3, it will be understood that the width of the rubber strips $x\ x$ should be in excess of the semi-circumference of the wire, so that when the wires and the strips are passed between the rollers the forming-grooves $r$ will compress the strips firmly around the wire, while the cutting-edges will cut off the excess on each side, which excess will readily escape from each side of the rollers and will be delivered from the periphery of the lower roller, and may be guided off by an attendant and allowed to accumulate on the floor or in a receptacle thereon, as will be understood. The strips, being soft and unvulcanized, will unite perfectly when pressed around the wire, as shown at A, B, and C, and form a uniform circular coating about the wire, as seen best at A. The rollers $n$ may be heated to promote the union of the rubber strips at their jointure, if desired.

It will be seen by reference to the drawings that the two bobbins $h\ h$ are set at opposite inclinations, and that the two spindles and bobbins are revolved in opposite directions, and that after the wire passes from the rollers $n$ and receives its preliminary rubber coating it then passes through the spindles $c\ c'$ and between the main feed-rollers $e\ e'$. The ends of the tapes on the two bobbins $h\ h$ being now fastened to the wire and the bobbins set at the proper angle and adjusted to the proper tension, the motion of the machine is continued by revolving the pulleys $p\ p'$ and $d\ d'$ in the directions indicated. The wire will therefore advance through the machine and will receive at first the preliminary coating of rubber at the rollers $n\ n$, as before described, (shown in section at A,) and immediately after will receive a spiral wrapping of tape from the first bobbin $h$, which will be wound about the wire in one direction, as seen in section at B, and immediately succeeding this a second coat of tape will be wrapped spirally over the first in an opposite direction from the second bobbin $h$, as shown in Figs. 1 and 2 and in section at C. The speed of the feed-rollers $e$ with relation to the revolution of the spindles $c\ c'$ will determine the lay of the spiral windings of tape, which are preferably wound so that the edges overlap, as will be understood.

The tape on the first bobbin $h$ is saturated with a rubber solution, as before described, and is also coated with a film of soft rubber on its inner side, which will therefore cause the tape to adhere firmly to the rubber coating of the wire or to the naked surface of the wire, as the case may be, when wound about the same, and will also cause the overlapping spiral joints of the tape to adhere firmly, and thus cause the tape to lie smooth and adherent as fast as it is wound on, as will be readily understood. The second tape from the bobbin $h'$ is prepared with a film of rubber on its inner face to adhere to the exterior of the first tape, and is preferably coated or saturated on its exterior with a fireproofing compound, as before described, so as to render the exterior of the finished wire fire-proof, as before specified.

Where the wire is very thick, it is passed straight between the lower feed-rollers, e e'; but ordinary sizes of wire are passed in a zigzag returning curve between and around the series of rollers and around the top of the upper roller, as shown in Fig. 1. This enables a better grasp to be obtained on the wire, and also acts as a straightening device to remove all kinks from the wire and to deliver the wire straight upon the winding drum w, on which the covered wire is accumulated, as will be understood.

After the drum w is filled it is removed to the kilns and subjected to the vulcanizing heat, which fixes the rubber and causes the different layers to become intimately bound together about the wire, as will be readily appreciated. It will therefore be seen that the product of this machine will be a most effectively insulated and protected wire having a triple coat of insulating and protecting layers. The first or rubber coat makes perfect contact with the wire and gives a perfect insulated and waterproof quality, while the two outer layers of tape oppositely wound add greatly to the insulating and impervious qualities and protect the inner rubber layer and render the entire coating exceedingly strong and flexible and very durable.

As before stated, the inner rubber coat may be omitted, and two or more of the tape-windings in reverse directions employed instead. In this case the rubber films of the tapes might be a little thicker than where the preliminary rubber coat is used. This would produce an excellent coating, less expensive than the other, and fully as well adapted for a great variety of uses. Where, however, a superior degree of insulation is desired, I prefer to employ the first rubber coat in connection with the two opposite tape-windings, as described.

The feed-rollers e e' are preferably made with a steel shaft and an elastic or yielding periphery formed of vulcanized rubber partly grooved, as indicated at y in the drawings, thereby forming an elastic grasping-surface to seize the wire with a frictional grasp, so that the wire partially embeds itself in the surface of the rollers and is grasped in a firm yet elastic manner, which does not injure or displace the coatings of tape in passing between the rollers.

Where it is desired to apply more than two successively-wound coatings to the wire, the number of successively-arranged bobbins and spindles may of course be increased without any change in the principle or action of the machine.

Referring to Fig. 3, it will be seen that the rollers n are formed and mounted in a peculiar manner—that is, the rollers are very narrow, each roller being wide enough only for the forming-groove and the cutting-edges, the rollers terminating beyond the cutting-edges in solid hubs o, which fit snugly between the journal-boxes $p^2$, and are fixed to the shafts $t^2$, which turn in said boxes and receive the gears u at one end, as usual in feed-rollers. In my former patent, No. 271,750, the rollers were wide and contained several forming-grooves with cutting-edges and relief-grooves beyond the cutting-edges and flat bearing-faces between the grooves, on which the rollers abutted together or bore upon each other, and were thus supported by mutual contact of the flat peripheral portions. In my present construction, however, the rollers do not abut or bear upon each other, as the only approaching peripheral parts are the narrow cutting-edges s, on which it would not be practical to have the rollers bear. The rollers are therefore supported entirely by the journal-boxes, which are adjusted toward each other by suitable supporting and adjusting devices, so as to cause the cutting-edges to approach in close juxtaposition without pressure on the edges, thus enabling the rollers to act most efficiently in forming or pressing the covering-strips on the wire and cutting off the excess without injuring the cutting-edges and allowing free escape for the cuttings. The journal-boxes move, as usual, in slots in the housing-frame v and are adjusted and supported by the screws $w^2$ and $w^3$. The screws $w^2$ screw through the threaded cross-bars of the housing-frame and have a shouldered end, as seen in Fig. 2, which engages with a socket-block, q, fixed on the top of the box, so that the screws have thus a positive engagement with the boxes both up and down, and will therefore adjust the boxes of the upper roller positively either up or down, and thus support the roller positively in its position of adjustment, so as to prevent the upper roller bearing injuriously on the lower roller. The boxes of the lower roller may be fixed in the slot of the housing-frame, or they may be movable. If movable I prefer to interpose between the boxes an adjustable screw, $w^3$, which may screw into one box and turn in the other, as illustrated in Fig. 1, and which may thus be so adjusted as to hold the boxes at the proper distance apart. Hence by the adjustment of both sets of screws $w^2$ $w^3$ the boxes may be held fixed at the desired adjustment and prevented from moving either up or down from the proper point of adjustment. The intermediate screws or adjustable supports, $w^3$, are not actually necessary where the screws $w^2$ are used to adjust the boxes both up and down; but I prefer to use the two together, as shown. Separate rollers with different-sized grooves will be provided for covering wires of different sizes, and the rollers are removable from the shafts, so that when different sizes of wires are to be covered one set of rollers may be removed from the shafts and another set of rollers fixed thereon, as will be readily understood from Fig. 3. This plan of rollers has the advantage of being cheaper and simpler in construction and more efficient in action.

Any suitable means for adjustably supporting the journal-boxes of the rollers besides that shown may be used.

Referring to Fig. 1, it will be noted that the arms $g$, on which the bobbins $h$ are supported from the pulleys $d$, are bent or curved in a proximate S form, and are secured to the pulley near its circumference, the arm being terminated with a shouldered bolt end which passes through and bears upon one side of the pulley and receives a nut, $g'$, on the opposite side, by which the arm is held in place. This construction allows of a better adjustment to place the bobbin at the proper angle to the travel of the wire, which adjustment may be retained by tightening the nut $g'$, as will be understood.

What I claim is—

1. In a wire-covering machine, feeding rollers having their grasping-surface formed of vulcanized rubber grooved and thus adapted to grasp the covered wire with a firm elastic pressure without injuring the coatings thereof, substantially as set forth.

2. The combination, with the bobbin $h$ and its supporting spindle or axis $i$, threaded at the end, of the washer $m'$, rotatively engaging the spindle, but free to slide thereon and abutting against the bobbin, with the nut $l$, screwing on the spindle, and the spring $m$, interposed between nut and washer, substantially as shown and described.

3. In a covering-machine, the combination, with the hollow spindle $c$, designed to receive the wire, pulley $d$, and bobbins $h$, of the bent arm $g$, having the bobbin mounted on one end, with the opposite end secured to the pulley and provided with clamp-nut $g'$, substantially as shown and described.

4. The combination, with the narrow rollers $n\ n$, having cutting-edges $s$, of movable journal-boxes in which the shafts of one or both rollers are supported, and adjustable supports for sustaining the boxes in fixed position, so as to cause the cutting-edges to approach without bearing on each other, substantially as shown and described.

5. The combination, with the narrow rollers $n\ n$, having cutting-edges $s$, of movable journal-boxes supporting the shaft of one of the rollers, and the adjusting and supporting screws $w'$, engaging and supporting the boxes in both directions, substantially as herein set forth.

6. The combination, with the narrow rollers $n\ n$ and movable journal-boxes in which the shafts of one or both rollers are mounted, of the adjusting-screws $w^2$, bearing on the outer boxes, and the intermediate adjustable supports, $w^3$, bearing between the two boxes, substantially as herein shown and described.

JOSEPH D. THOMAS.

Witnesses:
J. H. STICKNEY,
R. F. FOOTE.